United States Patent [19]
Shimizu et al.

[11] Patent Number: 5,752,268
[45] Date of Patent: May 12, 1998

[54] MINIMUM-DELAY RECOVERABLE DISK CONTROL SYSTEM USING CHECKPOINTS AND NONVOLATILE MEMORY

[75] Inventors: Kuniyasu Shimizu, Tokyo; Hideaki Hirayama, Kanagawa-ken, both of Japan

[73] Assignee: Kabushiki Kaisha Toshiba, Kanagawa-ken, Japan

[21] Appl. No.: 632,113

[22] Filed: Apr. 15, 1996

[30] Foreign Application Priority Data

Jun. 19, 1995 [JP] Japan ................... 7-151737

[51] Int. Cl.⁶ ............................................. G06K 12/16
[52] U.S. Cl. ........................ 711/162; 711/111; 364/DIG. 1
[58] Field of Search ..................... 365/200; 395/182.14, 395/440, 618, 872, 438, 489

[56] References Cited

U.S. PATENT DOCUMENTS

| | | | |
|---|---|---|---|
| 4,905,196 | 2/1990 | Kirrman | 365/200 |
| 5,241,672 | 8/1993 | Slomcenski et al. | 395/600 |
| 5,291,600 | 3/1994 | Lutz et al. | 395/182.13 |
| 5,390,186 | 2/1995 | Murata et al. | 395/440 |
| 5,392,445 | 2/1995 | Takamoto et al. | 395/800 |
| 5,421,003 | 5/1995 | Escola et al. | 395/182.14 |
| 5,535,381 | 7/1996 | Kopper | 395/872 |
| 5,555,391 | 9/1996 | De Subijana et al. | 395/440 |
| 5,588,110 | 12/1996 | DeKoning et al. | 395/182.03 |

FOREIGN PATENT DOCUMENTS 572019  12/1993  European Pat. Off. ........ G06F 11/14

*Primary Examiner*—Tod R. Swann
*Assistant Examiner*—David Langjahr
*Attorney, Agent, or Firm*—Finnegan, Henderson, Farabow, Garrett & Dunner, L.L.P.

[57] ABSTRACT

A recoverable disk control system for a computer system that includes a checkpoint operation. When an operating system generates a write request to a disk device, the write request and the associated write data are stored into a nonvolatile memory. The operating system is immediately notified as if the write request were completed. The writing the data to the disk device is postponed until the next checkpoint. At the end of the next checkpoint execution, the write request is scheduled for execution. In that case a fault occurs before the write request is scheduled, the write request is discarded.

18 Claims, 10 Drawing Sheets

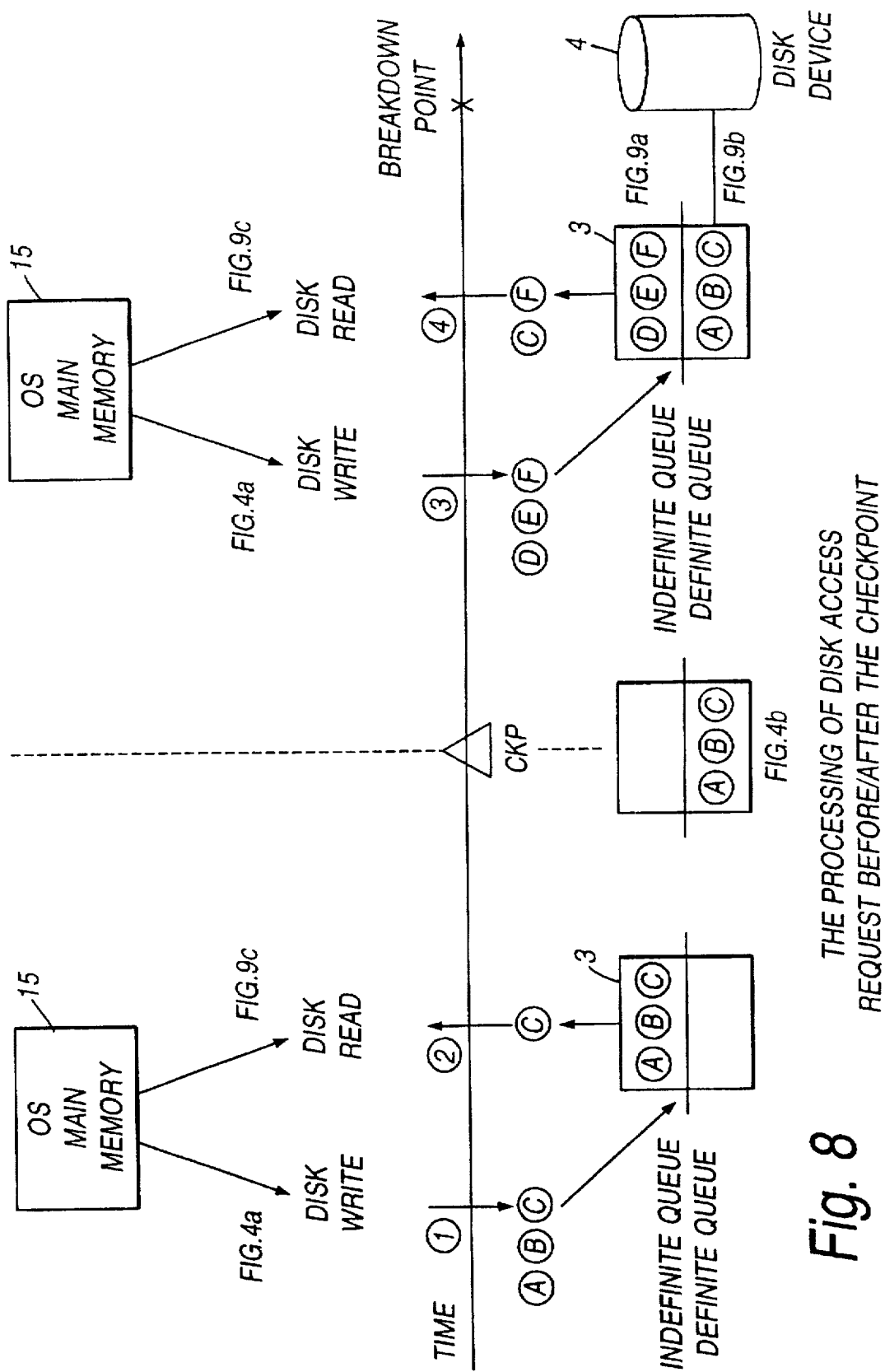

MINIMUM-DELAY RECOVERABLE DISK CONTROL SYSTEM USING CHECKPOINTS AND NONVOLATILE MEMORY

FIELD OF THE INVENTION

This invention relates to a computer system using a checkpoint method, and in particular, concerns a disk control system that enables high-speed disk access to avoid processing delay associated with the checkpoint method.

BACKGROUND OF THE INVENTION

A computer system using the checkpoint method postpones write operation to a disk device until the next checkpoint is acquired. Otherwise, if the next time the computer system restarts from the last checkpoint because of a fault, the disk device would not be able to be restored to the state of tie time of the last checkpoint. This causes a considerable performance degradation.

SUMMARY OF THE INVENTION

The purpose of this invention is to provide a recoverable disk device without the processing delay associated with the checkpoint method.

Another purpose of this invention is to accelerate a disk write operation by using a nonvolatile memory.

In accordance with the present invention, the foregoing objects, among others, are achieved by providing a computer system executing a checkpoint operation, the system restarting from the last checkpoint status if a fault occurred, the system comprising a disk device for reading and storing data, an operating system for issuing a write or a read request to the disk device, a nonvolatile memory, write request storage means for storing write data and an associated write request in the nonvolatile memory, disk write means for storing the write data stored in the nonvolatile memory by the write request storage means into the disk device, the disk write means further including means for storing write data according to the write request generated before the last checkpoint from the nonvolatile memory to the disk device.

There has also been provided,in accordance with another aspect of the present invention, a method of controlling disk access, comprising the steps of first storing write data and an associated write request from an operation system to a disk device into a nonvolatile memory, second storing the write data stored in the nonvolatile memory into the disk device, the second storing step including the step of storing write data generated before the last checkpoint from the nonvolatile memory to the disk device.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 8 is a time chart illustrating the operation of a disk control system, when a fault occurs in the computer system.

DESCRIPTION OF THE PREFERRED EMBODIMENTS

Figure 1A:
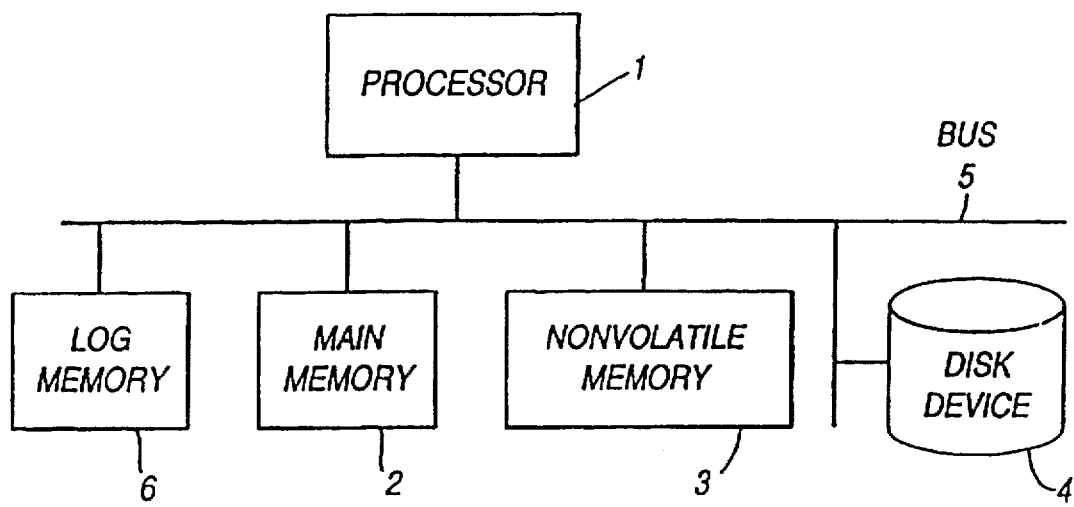
FIG. 1 is a schematic block diagram of a compute system using a checkpoint and in which the disk control system of this invention is applied.

One embodiment of this invention is explained, referring to the drawings.

FIG. 1(a) is a block diagram of a computer system using a checkpoint method to which the disk control system of this invention is applied.

When a processor 1 updates the content of a main memory 2, this computer system records the before image of the updated portion into a log memory 6. The information of context on the processor and the content of a cache memory are written in the main memory at a checkpoint. The state that is needed to restart data processing from the last checkpoint is kept in the main memory and the log memory. When a fault occurs, the computer system restores the main memory state of the last checkpoint by writing back the before image to the updated portion of the main memory. At the end of the checkpoint operation, the content of the log memory is cleared. Moreover, the computer system of this invention has a nonvolatile memory 3 as can auxiliary memory and a disk device 4.

Figure 1B:
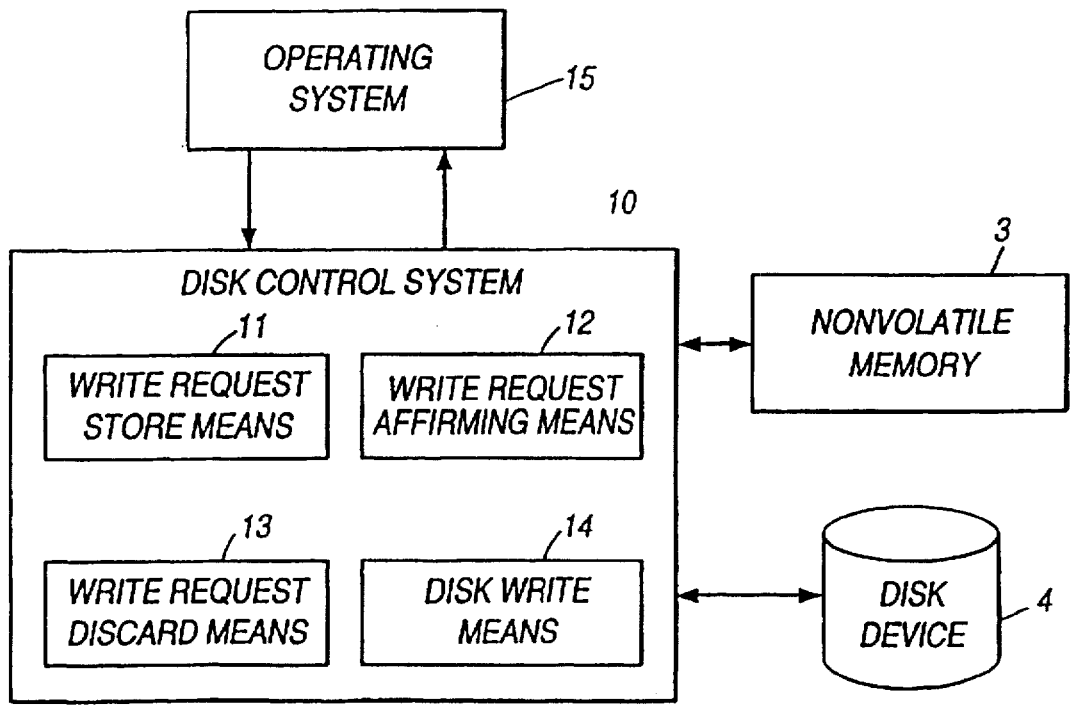

FIG. 1(b) is a block diagram of the disk control system of this invention. As shown in FIG. 1(b), the disk control system has a write request storage means 11, a write request affirming means 12, a write request discard means 13 and a disk write means 14.

When an operating system generates a write request to the disk device, the write request storage means stores the write request and the associated write data into the nonvolatile memory. Although the write request is kept in the nonvolatile memory at this point, the associated data can not be written to the disk device before the next checkpoint. If a fault occurs before the end of next checkpoint operation, the write request and write data are discarded. Hereafter, we say that such a write request and data stored in the nonvolatile memory are in an indefinite state.

When the operation of the next checkpoint is executed without any faults, the write request affirming means changes the state of the write request in the nonvolatile memory from an indefinite state to a definite state. This means that even if a fault occurs after such a change in state, the write request is definitely to be executed.

If a fault occurs before the next checkpoint execution, the write request discard means discards disk write requests and the associated data in the indefinite state.

The disk write means executes a disk write operation according to disk write requests in the definite state kept in the nonvolatile memory.

Next, the operation of this invention is explained, referring to FIGS. 2-9, which are block diagrams and flow charts illustrating the operation of one embodiment of this invention.

First, as shown in FIG. 1(a), when a write request to the disk device is received from the operating system, the write request storage means puts the write request and the associated write data in the nonvolatile memory.

Figure 2:
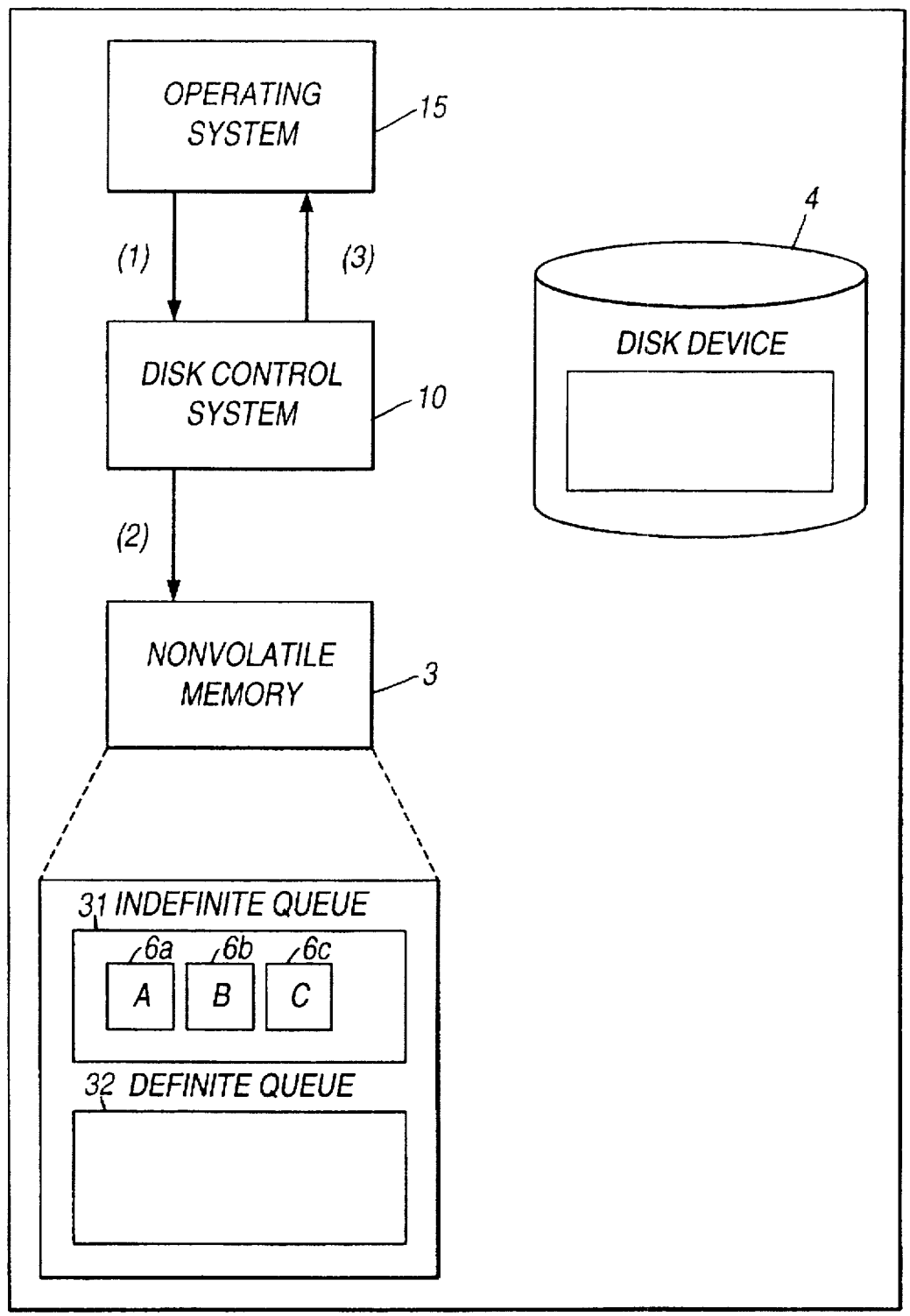
FIG. 2 is a schematic block diagram illustrating the elements of one embodiment of a computer system where a write request sends data to a nonvolatile memory.

As depicted in FIG. 2, the nonvolatile memory has an indefinite queue 31 and a definite queue 32. A write request and the associated write data received after the last checkpoint are stored in the indefinite queue of the nonvolatile memory. Upon execution of the checkpoint without a fault, the write requests and the associated write data in the indefinite queue are moved to the definite queue of the nonvolatile memory.

Figure 4A:
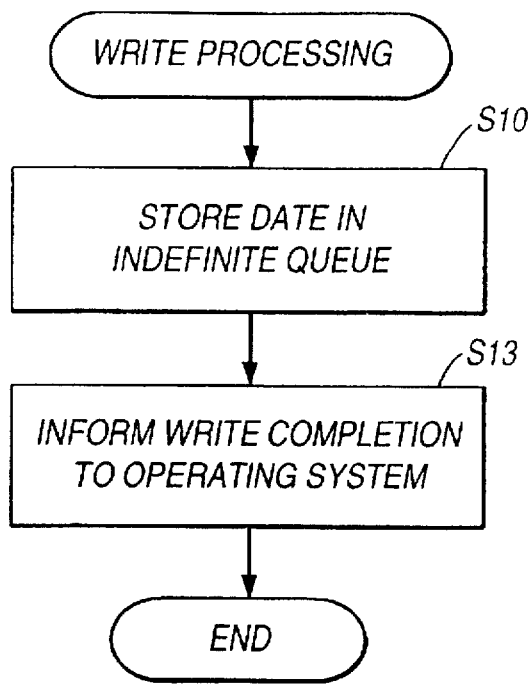
FIG. 4(a) is a flow chart illustrating the writ process of this disk control system.

When a write request is stored in the indefinite queue of the nonvolatile memory by the write request storage means, the disk control system informs "write completion" to the operating system (S13 in FIG. 4(a)). Thereby, the operating system does not have to wait for the actual completion of the write request, which improves performance considerably.

Figure 3:
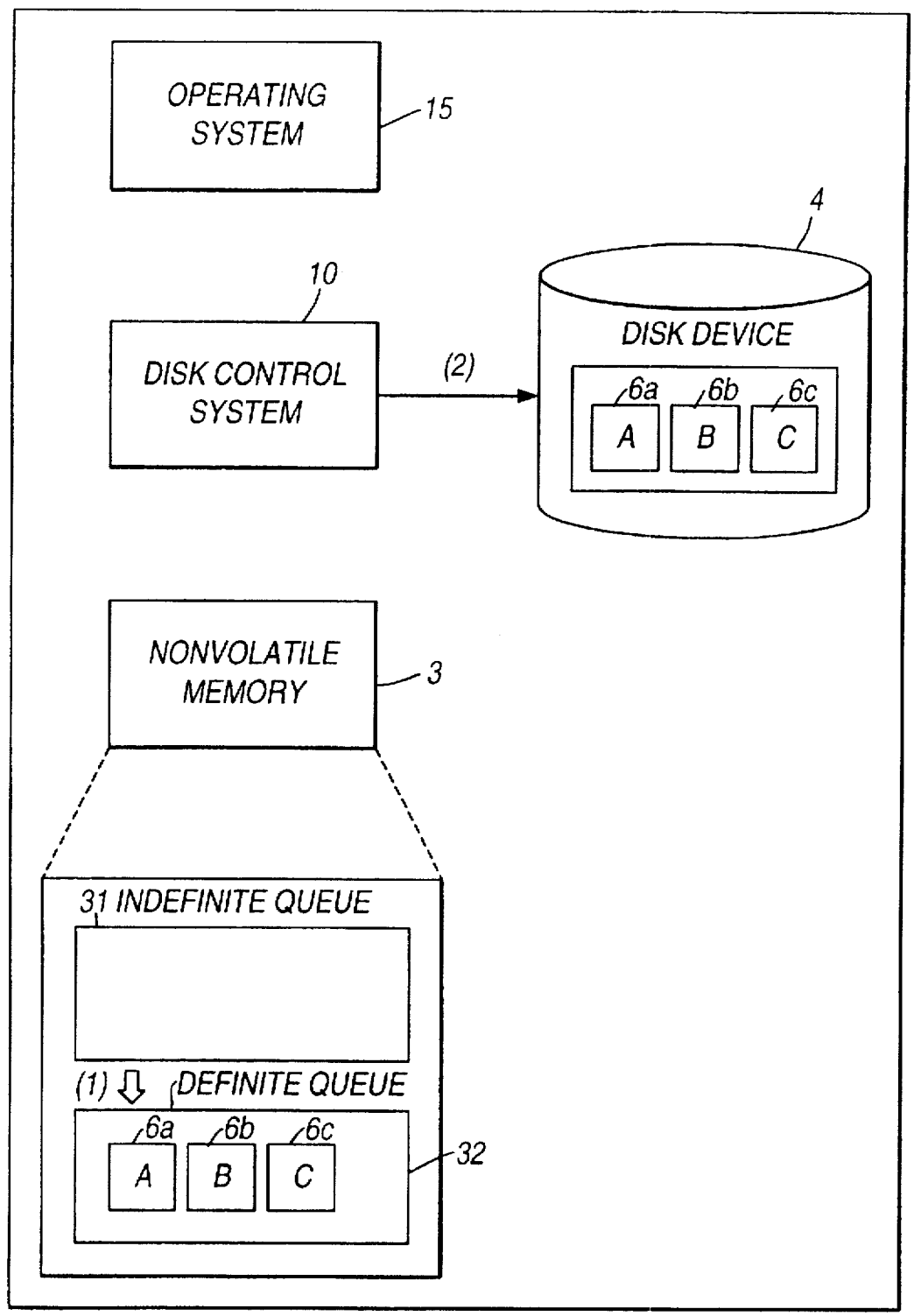
FIG. 3 is a schematic block diagram illustrating the movement of data from the indefinite queue to the definite queue.

Next, the operation of the disk control system during a checkpoint execution is explained, referring to FIG. 3.

It is assumed that the checkpoint of this computer system is executed at a state shown in FIG. 2. When the nonvolatile memory is filled with write data, a checkpoint is compulsorily executed. The disk control system checks the size of the free area of the nonvolatile memory. If the capacity of the nonvolatile memory is below a predetermined value, or after a fixed time to execute the checkpoint of the computer system has elapsed, I/O processing from the operating system is restarted. The I/O processing from the operating system is delayed, while the checkpoint is being executed.

Figure 4B:
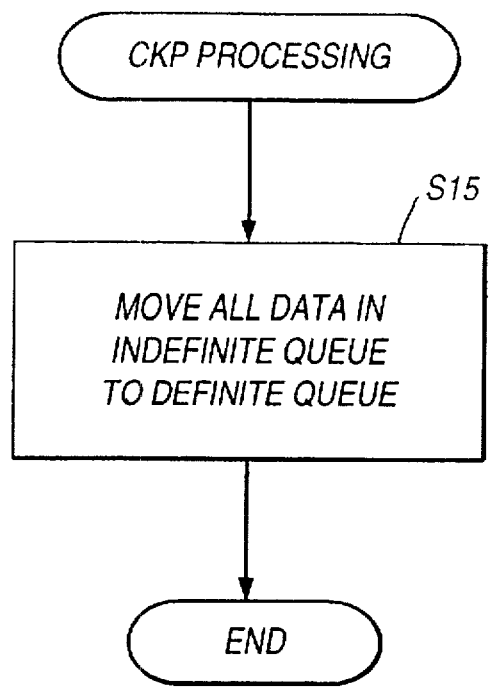
FIG. 4(b) is a flow chart illustrating the checkpoint operation of this disk control system.

During checkpoint operation, first, write requests and their write data stored in the indefinite queue are moved to the definite queue by the write request affirming means (FIG. 3 and S15 in FIG. 4(b)). This movement does not necessarily need physical movement of the whole data; changing pointers suffices. The method of controlling a write request and write data stored in the nonvolatile memory is explained later, referring to FIG. 5.

Figure 4C:
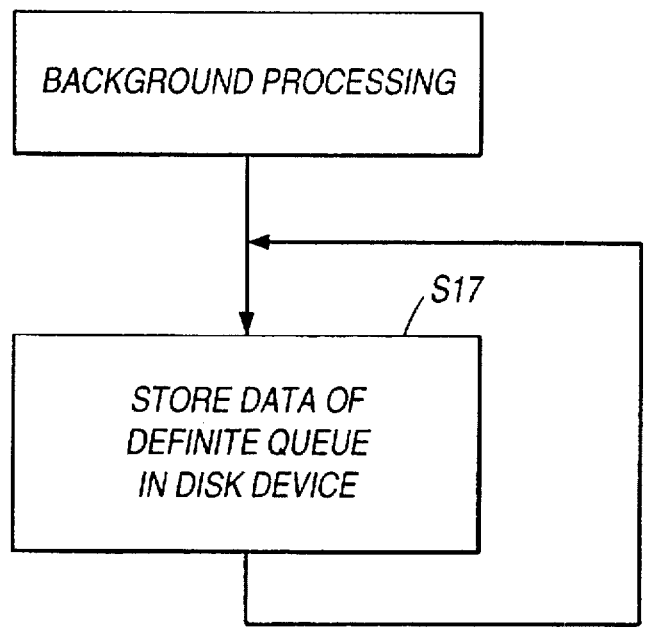
FIG. 4(c) is a flow chart illustrating the background processing of this disk control system.

After the checkpoint, the disk write means executes the disk write operation according to the write request stored in the definite queue (FIG. 3 and S17 in FIG. 4(c)). It is recommended that the write operation to the disk device by the disk write means is properly executed according to the priority of the write request and the load of the computer system.

Figure 5A:
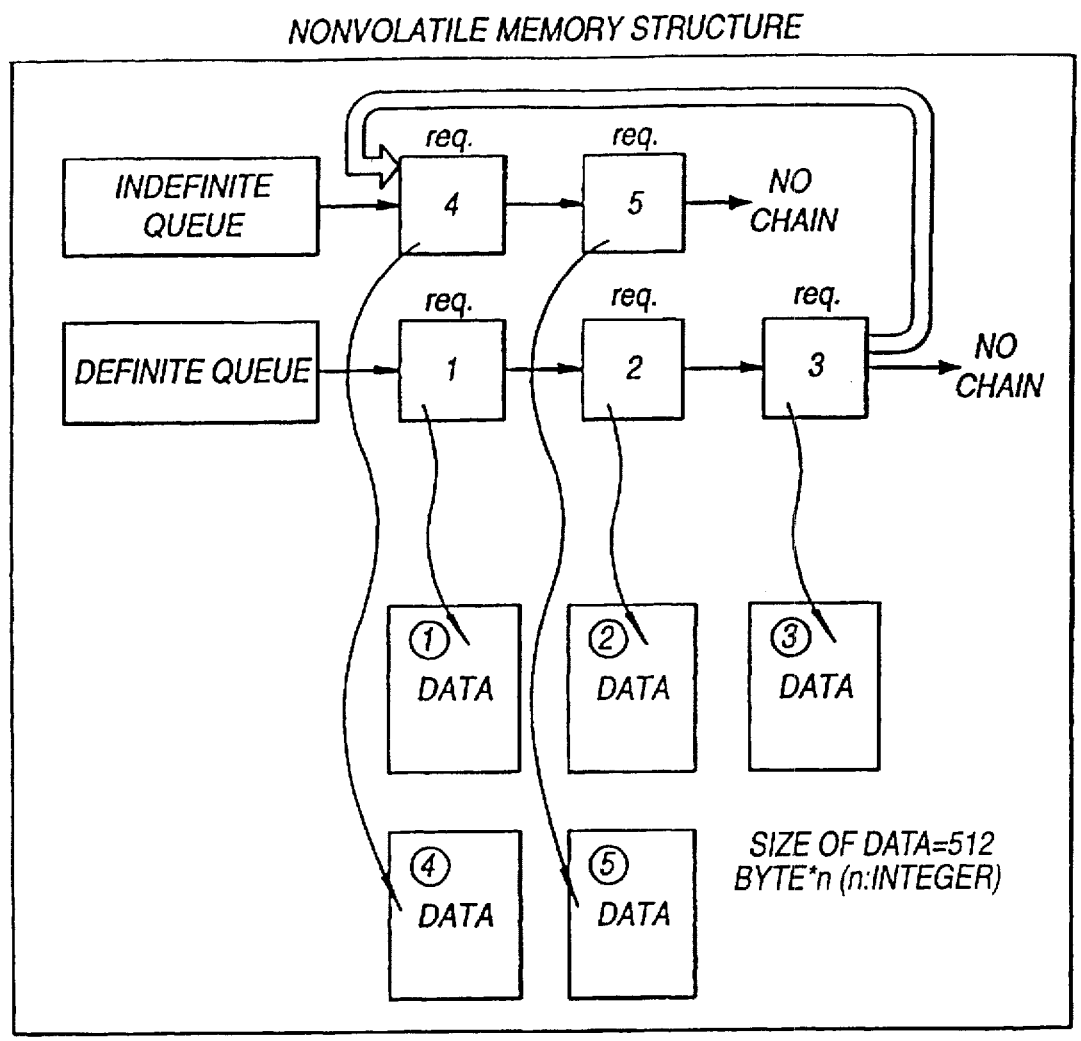
FIG. 5(a) is a block diagram illustrating the link control structure of a nonvolatile memory.
Figure 5C:
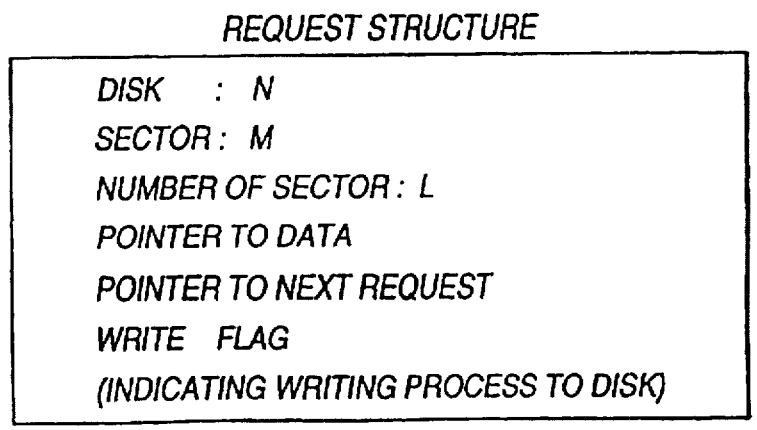
FIG. 5(c) illustrates write data and write request structures in the nonvolatile memory.
Figure 5B:
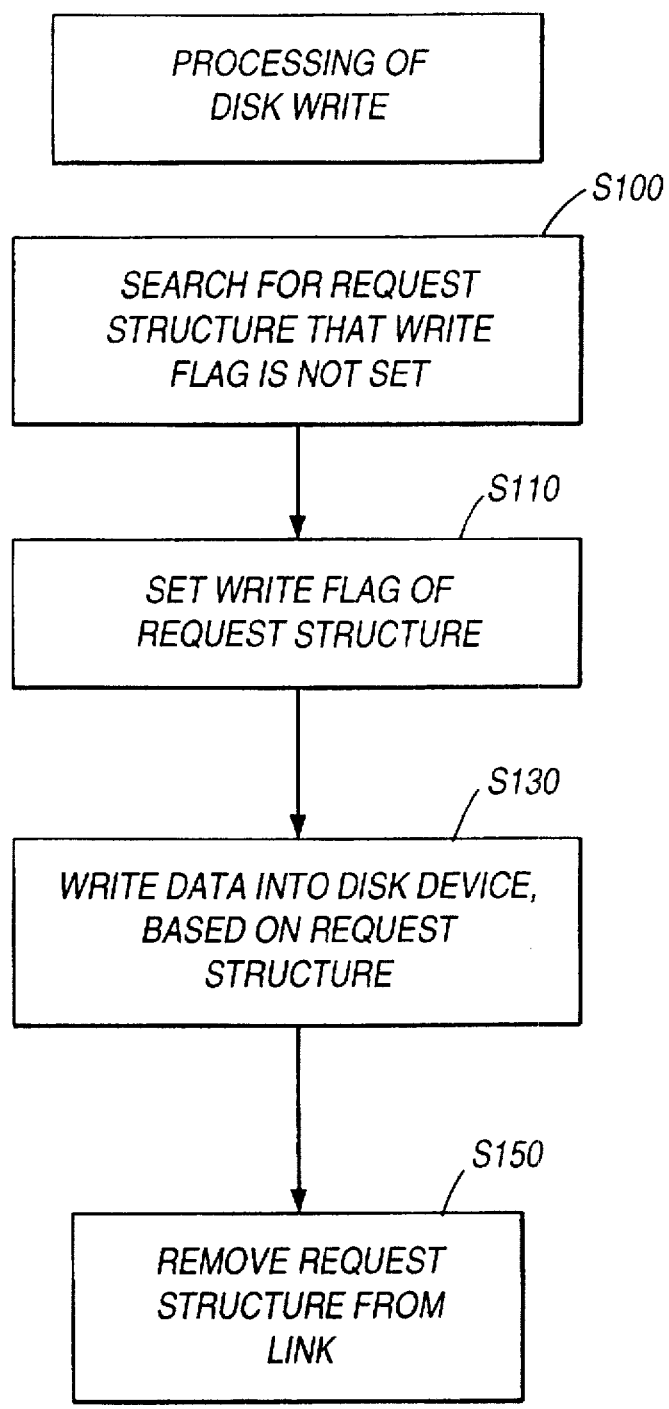
FIG. 5(b) is a flow chart illustrating the processing of a disk write.

The nonvolatile memory contains an indefinite queue, a definite queue, request structures, and write data, referring to FIG. 5(a). The indefinite queue and the definite queue have a control block (not shown) for managing the request structures. The indefinite queue has two request structures 4 and 5 as shown in FIG. 5(a). The definite queue has three request structures 1, 2 and 3 as shown in FIG. 5(a). Control information on a request structure has a write flag which shows that the data is now writing to the disk device pointer information to the write data and next request structure, a disk number N, a sector number M, and the size of write data L, to store the write data kept in the definite queue into the disk device as shown in FIG. 5(c). The size of the write data is a multiple of 512 bytes. For instance, the request structure 3 has the write data of 2*512 bytes.

When a next checkpoint operation is executed, the next request pointer information of the request structure 3 is changed to point to a request structure 4. The next request pointer information of a request structure 5 remains unchanged. The control block of the indefinite queue also has means for managing the request structure 4 until a next checkpoint operation is executed. The control block of the indefinite queue does not manage the request structure 4 after the next checkpoint operation is executed.

Next, a write operation to the disk is explained referring to FIG. 3. The disk write means searches the define queue for the request structure where a write flag is not set yet (S100 in FIG. 5(b)). The disk write means gets the number of the request structures, the size of the write data, and the control information on the request structure from the control block one by one. Next, the disk write means sets the write flag of the request structure 1, of which the flag has not been set yet, through the control block of the definite queue (S110 in FIG. 5(b)). The disk write means stores the write data in the disk according to the request structure 1 (S130 in FIG. 5(b)). When the writing process of the disk ends, the disk write means removes the request structure 1 and the associated data from the link through the control block (S170 in FIG. 5(b)). The write flags of the request structures 2, 3, 4 and 5 are set one by one by the similar way. The write data of the request structures 2, 3, 4 and 5 are written in the disk device.

Figure 6:
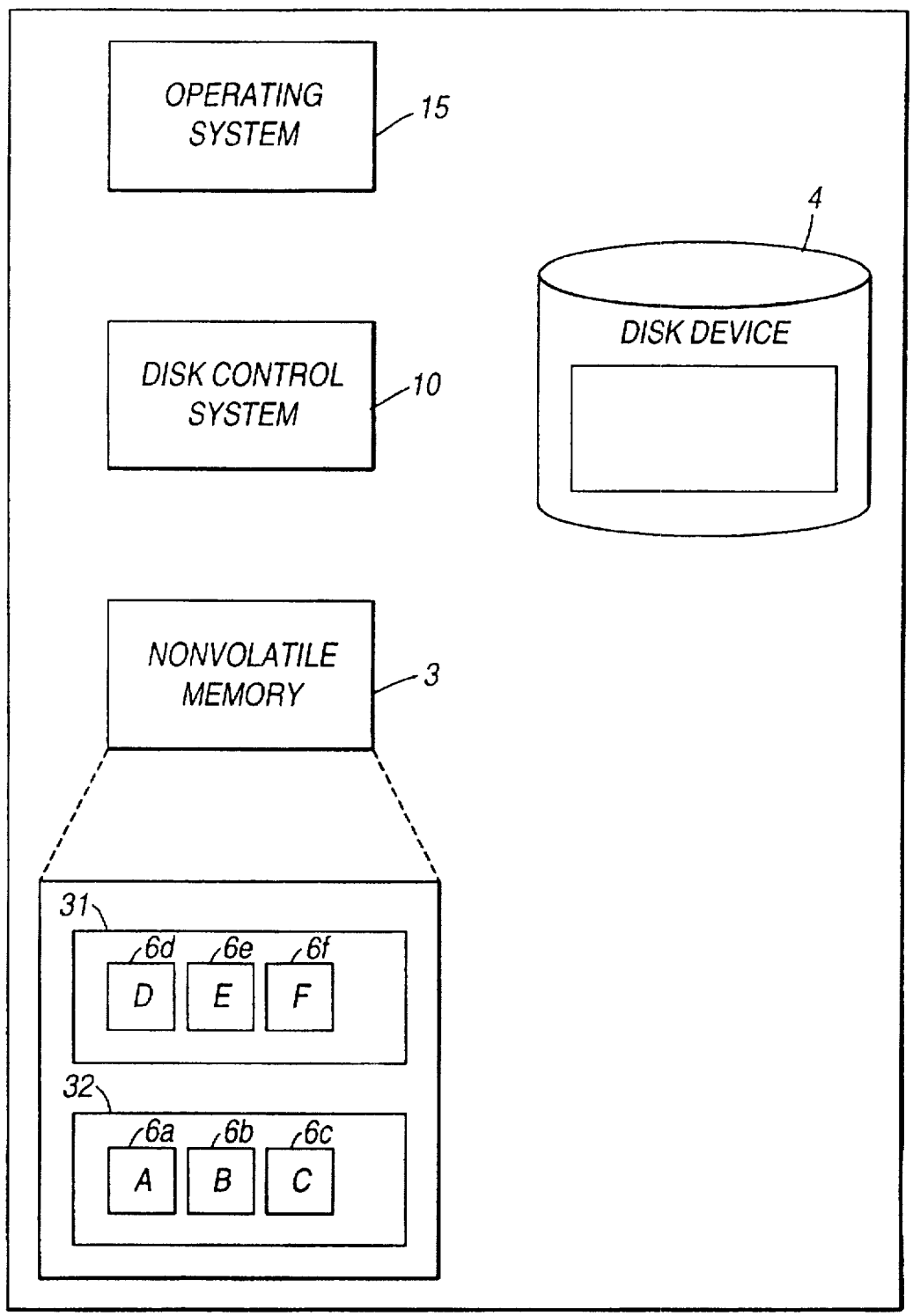
FIGS. 6 and 7 are block diagrams illustrating the operation of a disk control system, when a fault occurs in the computer system.
Figure 7:
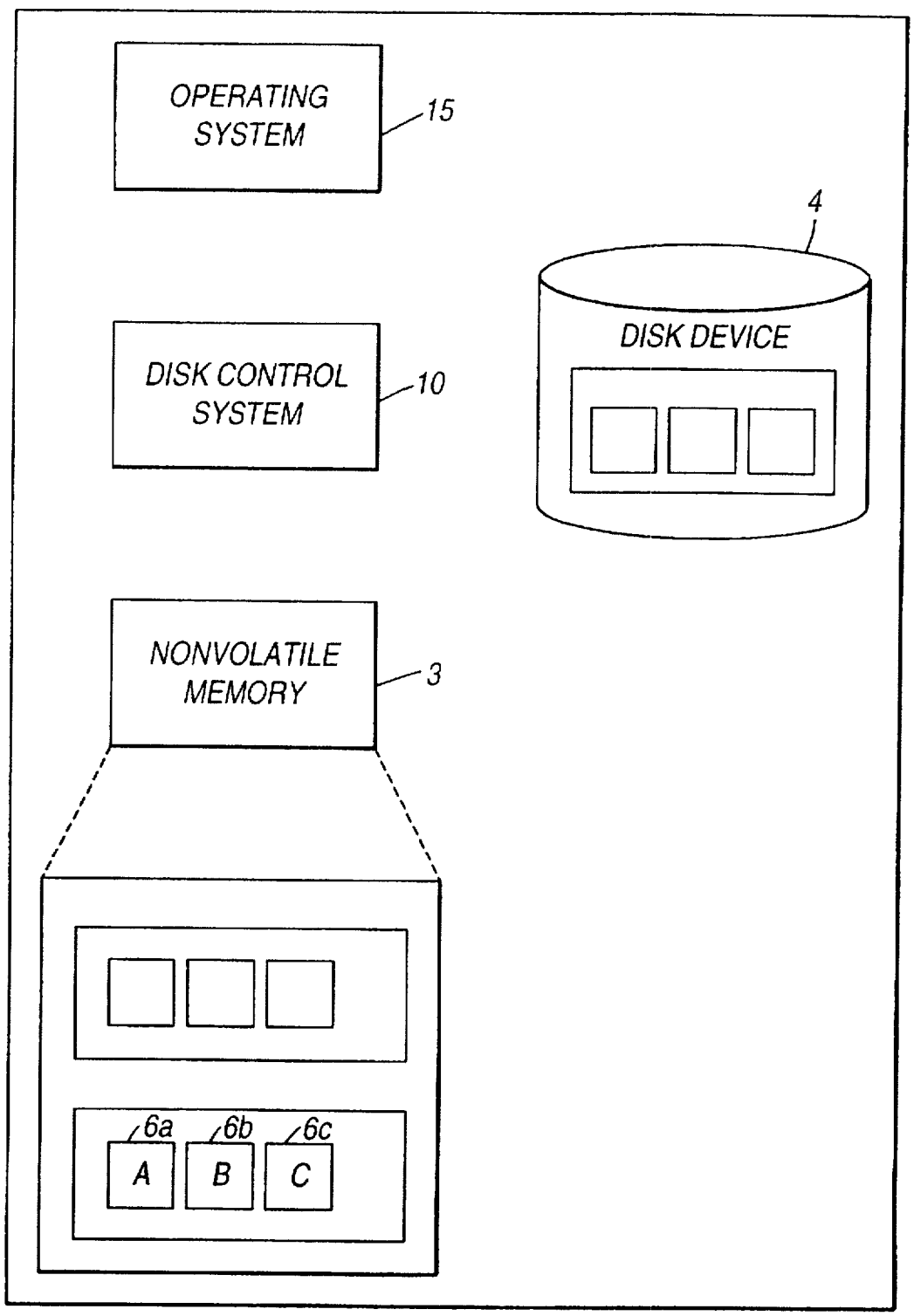

Here, the operation of this invention is explained, when a fault occurs in the computer system, referring to FIGS. 6-8.

As shown in FIG. 8, a disk write request from the operating system stores write requests and write data A, B and C in the indefinite queue in the nonvolatile memory one by one (point ① in FIG. 8) The operating system reads the data C from the indefinite queue in the nonvolatile memory (point ② in FIG. 8). During the next checkpoint operation as shown in FIG. 8, under such a condition, A, B, and C that are stored in an indefinite queue of the nonvolatile memory, link to a definite queue (CKP point in FIG. 8). Also, a disk write request and write data from the operating system generated after the last checkpoint are linked to the indefinite queue.

After that, the write request and the write data D, E and F are linked in the indefinite queue of the nonvolatile memory one by one (point ③ in FIG. 8). A disk read request from the operating system reads the data F from the indefinite queue and the data C from the definite queue in the nonvolatile memory (point ④ in FIG. 8)

It is assumed that a fault occurred in the computer system after the checkpoint (breakdown point in FIG. 8). The three write requests of 6d-6f (D, E and F) were stored in the indefinite queue as shown in FIGS. 6 and 8. The three write requests of 6a-6c (A, B and C) were stored in definite queue as shown in FIGS. 6 and 8.

In this case, the computer system of this invention first restores the computer system to the state of the last checkpoint (CKP point in FIG. 8). The computer system begins restarting from the checkpoint state after the restoring process.

Figure 9A:
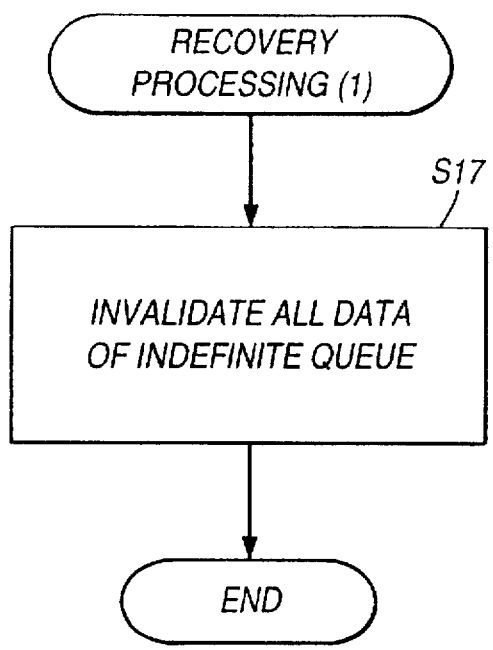
FIG. 9(a) is a flow chart illustrating the recovery sequence (1) of this disk control system.
Figure 9B:
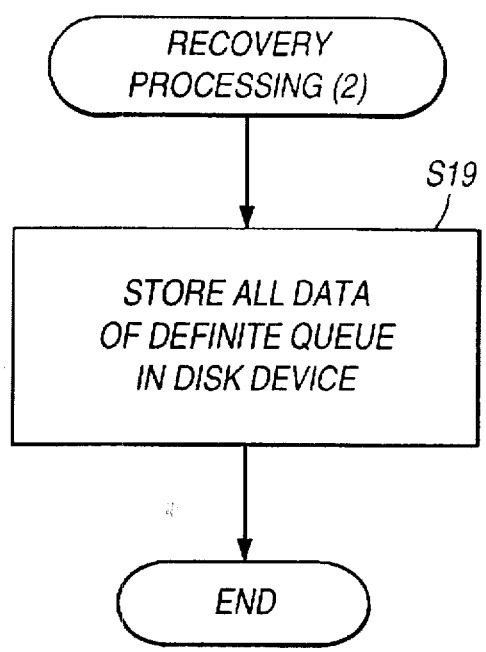
FIG. 9(b) is a flow chart illustrating the recovery sequence (2) of this disk control system.

When the computer system is restarted, the disk control system discards all the write requests 6d–6f stored in the indefinite queue in the nonvolatile memory by the write request discard means (S17 in FIG. 9(a)). The write requests 6d–6f and the associated data are issued again because the system restarts from the last checkpoint state as mentioned above.

FIG. 7 illustrates the state of the nonvolatile memory after this recovery processing.

On the other hand, even if the state of the computer system rolls back to the last checkpoint, the write requests 6a–6c stored in the definite queue in the nonvolatile memory are effective. Therefore the disk write requests 6a–6c are properly stored in the disk device by the disk write means (S19 in FIG. 9(b)).

As a result consistency of disk operations is maintained under control of the checkpoint method with this recoverable disk control system. In addition, the delay of the disk write according to the checkpoint method can be excluded. Thus, the latency of the disk access can be improved.

Next, a read request from the operating system is explained, referring to FIGS. 8 and 9.

Figure 9C:
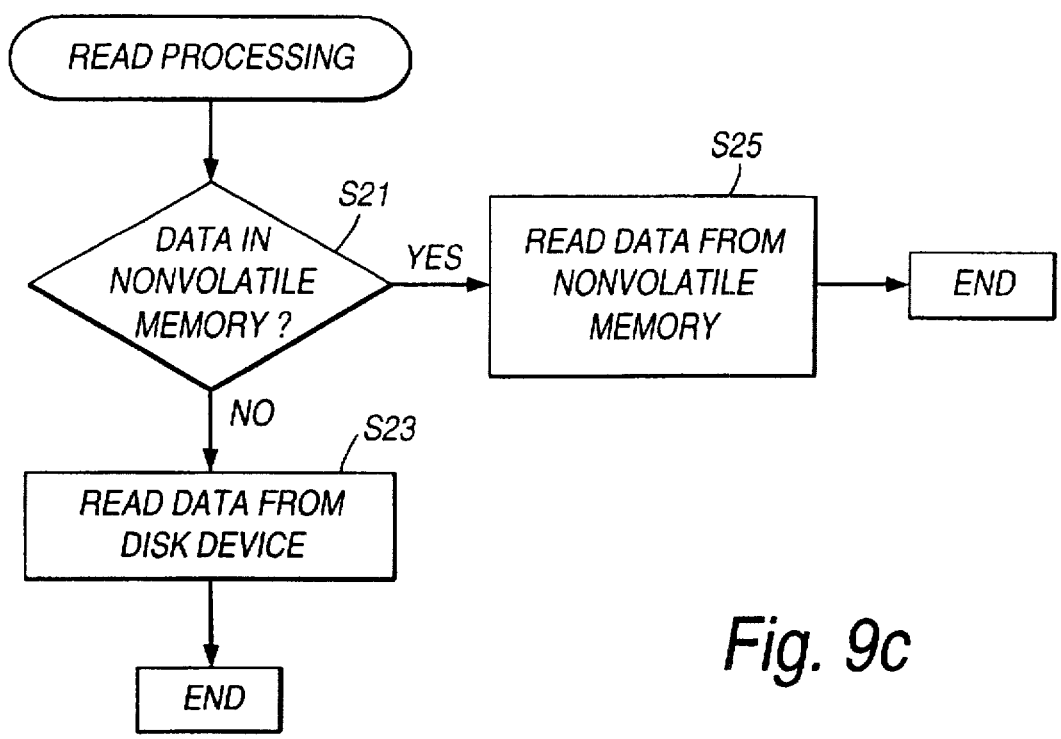
FIG. 9(c) is a flow chart illustrating the read processing of this disk central system.

At this time, the disk control system decides whether there are data to be read from the nonvolatile memory (S21 in FIG. 9(c)). If there are data to be read out (Yes of S21 in FIG. 9(c)), the data is read from the nonvolatile memory (② and ④ points in FIGS. 8 and S25 in FIG. 9(c)). After that, this read processing ends.

On the other hand, if there are not data to be read from the nonvolatile memory (No of S21 in FIG. 9(c)), the disk control system accesses the disk device (S23 in FIG. 9(c)). At this point, it is recommended that the data read from the disk device is able to be stored in the nonvolatile memory.

As explained in detail above, when a fault in the computer system occurs, this invention may have stored a write request into the definite queue of the nonvolatile memory. The write request which is generated before the last checkpoint operation is executed. Also this invention stores a write request in the indefinite queue of the nonvolatile memory, the write request which is generated after the last checkpoint is executed after the next checkpoint. For instance, even if a power supply failure occurs in the computer system, the information of the write request is maintained because the information on the write request is stored in the nonvolatile memory.

The disk control system of this invention abandons all the write requests and the write data generated after the last checkpoint which are stored in the indefinite queue in the nonvolatile memory. However, the data in the definite queue is written into the disk device. Thus, oven if the computer system is broken down by the power supply failure, the write data in the definite queue is written into the disk device at the reboot of the computer system.

Concurrently with the processing of write requests from the operating system, write data which are generated before the last checkpoint is stored in the disk device.

Moreover, as for a read request to the disk device, the disk control system of this invention first examines whether the requested data is on the nonvolatile memory so that the read request keeps coherency just like normal access to the disk device.

As a result, the disk control system of this invention can secure fault tolerance of the computer system. The disk control system of this invention can improve the latency of the disk access by avoiding the delay resulting from a checkpoint execution.

Numerous modifications and variations of the present invention are possible in light of the above teachings. It is therefore to be understood that, within the scope of the appended claims, the present invention can be practiced in a manner other than as specifically described herein.

What is claimed is:

1. A computer system executing a checkpoint operation, the system restarting from a last checkpoint status if a fault occurred, the system comprising:

a disk device for reading and storing data;

an operating system for issuing a write or a read request to the disk device;

a nonvolatile memory;

write request storage means for storing write data and an associated write request in the nonvolatile memory;

means for notifying the operating system of a write completion after storing the write request and the associated write data in the nonvolatile memory, when the operating system issues a write request to the disk device; and disk write means for storing write data, stored in the nonvolatile memory according to the write request generated before a last checkpoint, from the nonvolatile memory to the disk device after passing the last checkpoint.

2. A computer system of claim 1, further comprising:

means for reading the write data from the nonvolatile memory if there is the corresponding data on the nonvolatile memory, when the operating system issues a read request to the disk device; and means for reading the write data from the disk device, if there is not the corresponding data on the nonvolatile memory.

3. The computer system of claim 1, further comprising write request discard means for invalidating write data and corresponding write requests generated after the last checkpoint, when a fault occurred in the system.

4. The computer system of claim 1, wherein the write request storage means includes an indefinite queue for storing a write request which is generated after the last checkpoint, and a definite queue for storing a write request which is generated before the last checkpoint.

5. The computer system of claims 4, further comprising write request affirming means for moving the write data stored in the indefinite queue to the definite queue, while a checkpoint operation is executed.

6. The computer system of claim 4, wherein the write request storage means includes means for storing the write request and the associated write data in the indefinite queue.

7. The computer system of claim 4, wherein the disk write means includes means for storing the write data stored in the definite queue into the disk device.

8. The computer system of claim 4, further comprising means for storing all write data stored in the definite queue into the disk device, while rebooting the computer system.

9. The computer system of claim 4, wherein the indefinite and definite queues includes control block means for controlling each of write data and the associated write request, each of the write data having a request structure for linking write data and next request structure.

10. The computer system of claim 9, wherein the request structure includes a writing flag for indicating that the write processing to the disk device is executed.

11. The computer system of claim 10, wherein the disk write means comprises:

means for detecting whether a writing flag of the request structure is set or not;

means for setting the writing flag, if the write flag is not set;

means for storing write data of the definite queue to the disk device, based on information of the request structure; and means for removing the request structure and the associated write data when writing the data to the disk device is completed.

12. A method of controlling disk access, comprising the steps of:

first, storing write data and an associated write request from an operating system to a disk device into a nonvolatile memory;

notifying the operating system of a write completion after storing the write data and the associated write request in the nonvolatile memory, when a write request from the operating system to the disk device is issued; and second, storing the write data, stored in the nonvolatile memory according to the write request generated before a last checkpoint, from the nonvolatile memory to the disk device after passing the last checkpoint.

13. The method of claim 12, further comprising the steps of:

first reading the data from the nonvolatile memory if there is acquired write data among write data stored in the nonvolatile memory, when the operating system issues a read request to the disk device; and second reading write data from the disk device, if there is not acquired write data among write data stored in the nonvolatile memory.

14. The method of claim 12, further comprising the step of invalidating all write data and the corresponding write request generated after the last checkpoint, if a fault has occurred.

15. The method of claim 12, wherein the nonvolatile memory includes an indefinite queue for storing write data and the associated write request which was generated after the last checkpoint, and a definite queue for storing write data to the disk device generated before a last checkpoint, further comprising the step of moving the write request and write data stored in an indefinite queue to a definite queue, while a checkpoint operation is executing.

16. The method of claim 12, wherein the nonvolatile memory includes an indefinite queue for storing write data and the associated write request which generated after the last checkpoint, and a definite queue for storing write data into the disk device generated before the last checkpoint, wherein the second storing step includes the step of storing the write data stored in the definite queue into the disk device.

17. The method of claim 12, wherein the nonvolatile memory includes an indefinite queue for storing write data and the associated write request which generated after the last checkpoint, and a definite queue for storing write data and the associated write request to the disk device generated before the last checkpoint, further comprising the step of storing all write data stored in the definite queue into the disk device, while recovering the computer system.

18. The method of claim 12, wherein the nonvolatile memory includes an indefinite queue for storing write data and the associated write request which generated after the last checkpoint, wherein the first storing step includes the step of discarding the write data and write requests in the indefinite queue after a fault occurred.

* * * * *